(12) United States Patent
Kato et al.

(10) Patent No.: US 10,156,296 B2
(45) Date of Patent: Dec. 18, 2018

(54) LOAD DRIVING CONTROLLER

(71) Applicant: FUJITSU TEN LIMITED, Kobe-shi, Hyogo (JP)

(72) Inventors: Tomohito Kato, Kobe (JP); Takeshi Dowa, Kobe (JP); Shingo Matsuda, Kobe (JP); Tomoyuki Kato, Kobe (JP)

(73) Assignee: FUJITSU LIMITED, Kobe (JP)

( * ) Notice: Subject to any disclaimer, the term of this patent is extended or adjusted under 35 U.S.C. 154(b) by 0 days.

(21) Appl. No.: 15/783,705

(22) Filed: Oct. 13, 2017

(65) Prior Publication Data
US 2018/0142800 A1    May 24, 2018

(30) Foreign Application Priority Data
Nov. 24, 2016 (JP) .................................. 2016-227781

(51) Int. Cl.
*F16K 31/06* (2006.01)
*H01F 7/18* (2006.01)

(52) U.S. Cl.
CPC ....... *F16K 31/0675* (2013.01); *H01F 7/1844* (2013.01)

(58) Field of Classification Search
CPC ............. F16K 31/0675; F16K 31/0644; H01F 7/1805; H01F 7/1844; H01F 7/1855; H01F 71/1866; G05F 1/56; G05F 1/565; G05F 1/575; G05F 1/595
See application file for complete search history.

(56) References Cited

U.S. PATENT DOCUMENTS

| | | | | |
|---|---|---|---|---|
| 9,787,315 B1* | 10/2017 | Watanabe | ........... | H03M 1/1255 |
| 2014/0254058 A1* | 9/2014 | Suzuki | ................ | H01H 47/325 |
| | | | | 361/153 |
| 2016/0131248 A1* | 5/2016 | Mizuno | ............... | F16H 61/0021 |
| | | | | 701/51 |

FOREIGN PATENT DOCUMENTS

| | | |
|---|---|---|
| JP | H08-303628 A | 11/1996 |
| JP | 2013-162087 A | 8/2013 |
| JP | 2015-216421 A | 12/2015 |

* cited by examiner

*Primary Examiner* — Matthew Nguyen
(74) *Attorney, Agent, or Firm* — Oliff PLC

(57) ABSTRACT

A controller according to the present disclosure includes a target current controller, a dither controlling unit, an output-duty generating unit, and a Pulse-Width-Modulation-pulse (PWM-pulse) converting unit. The dither controlling unit generates a dither duty for providing, to a target current duty of a load, a dither having predetermined dither period. The target current controller calculates, for each predetermined feedback period, an average value of a feedback current from the load and generates the target current duty based on the average value. The output-duty generating unit generates an output duty obtained by adding the dither duty generated by the dither controlling unit to the target current duty generated by the target current controller. The PWM-pulse converting unit converts the output duty generated by the output-duty generating unit to PWM pulses.

6 Claims, 11 Drawing Sheets

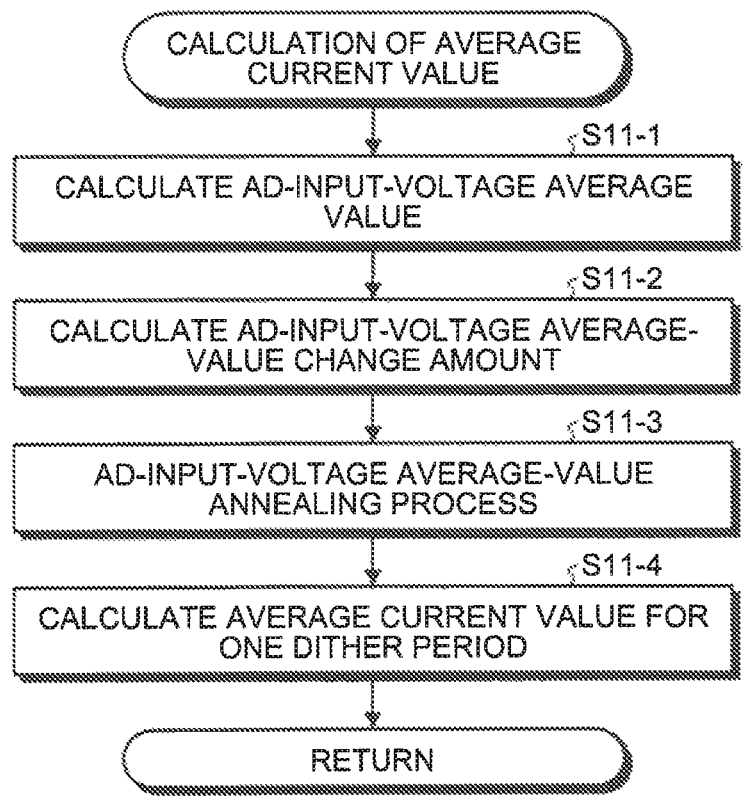

FIG.7

―――― AD-INPUT-VOLTAGE AVERAGE VALUE OF LAST DITHER PERIOD WHEN DITHER FREQUENCY IS 200 [Hz] (BEFORE-ANNEALING VALUE)
‥‥‥ AD-INPUT-VOLTAGE AVERAGE VALUE OF LAST DITHER PERIOD WHEN DITHER FREQUENCY IS 100 [Hz]

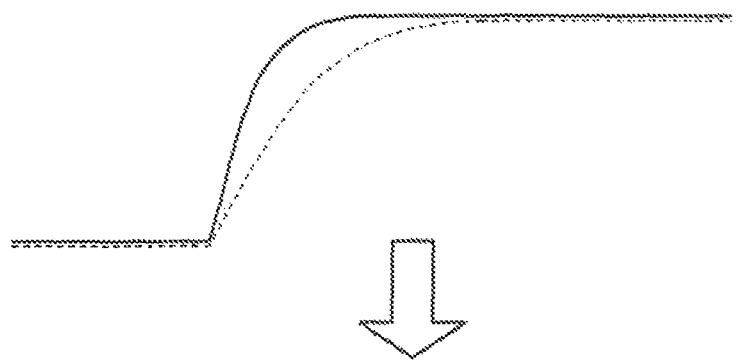

―――― AD-INPUT-VOLTAGE AVERAGE VALUE OF LAST DITHER PERIOD WHEN DITHER FREQUENCY IS 200 [Hz] (AFTER-ANNEALING VALUE)
‥‥‥ AD-INPUT-VOLTAGE AVERAGE VALUE OF LAST DITHER PERIOD WHEN DITHER FREQUENCY IS 100 [Hz]

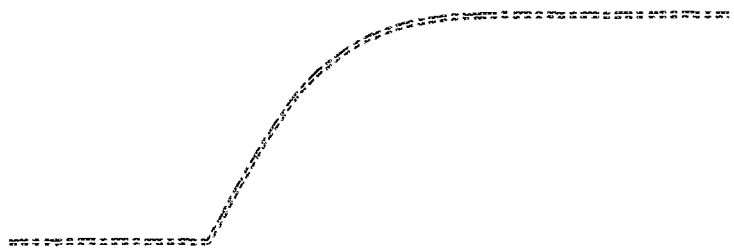

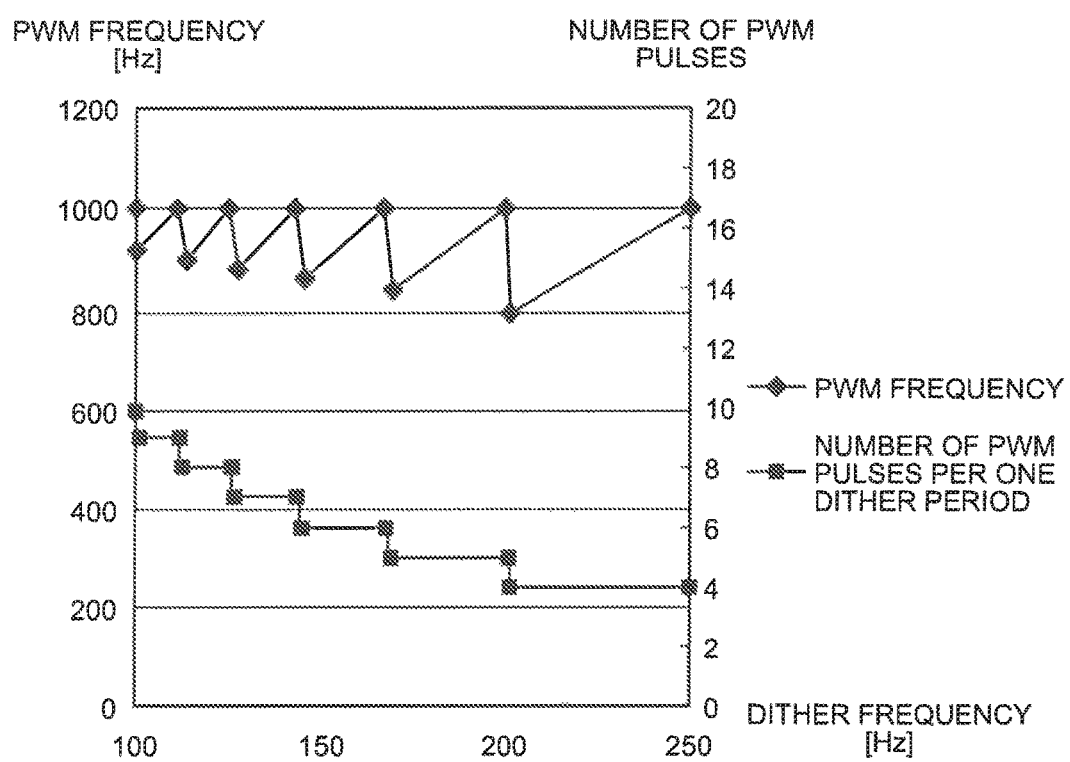

LOAD DRIVING CONTROLLER

CROSS-REFERENCE TO RELATED APPLICATION

This application is based upon and claims the benefit of priority of the prior Japanese Patent Application No. 2016-227781, filed on Nov. 24, 2016, the entire contents of which are incorporated herein by reference.

FIELD

The embodiment discussed herein is directed to a load driving controller.

BACKGROUND

Recently, there grows societal tendency toward safety, low-fuel consumption, and pollution reduction of vehicles, and thus a field of automotive electronics is rapidly developed. In such a background, for example, an automatic transmission having little transmission shock and variable intake and exhaustion valves of an engine come to be employed for a vehicle.

A linear solenoid, which is a kind of actuator (load), is driven by a driving circuit such as an Electronic Control Unit (ECU) to be able to supply the hydraulic pressure of lines that is linearly changed in accordance with control current. Therefore, by employing a linear solenoid for control over a planetary gear, a lock-up clutch, and the line pressure of a transmission of a vehicle, it is possible to reduce a transmission shock and to improve the fuel consumption. Moreover, by employing a linear solenoid for control over an open/close operation of variable intake and exhaustion valves of an engine, it is possible to improve the cleanliness of exhaust gas, torque, output power, and fuel consumption.

For example, a technology is disclosed, which is for reducing degradation in response performance of a linear solenoid caused by the viscosity of oil for generating the hydraulic pressure of lines so as to slightly vibrate (dither) a movable body of the linear solenoid around a predetermined position (see Japanese Laid-open Patent Publication No. 08-303628, for example). The linear solenoid alternately outputs Pulse-Width-Modulation pulses (PWM pulses) based on two Duty ratios for each predetermined time interval and drives and slightly vibrates a movable body of the linear solenoid so as to reduce the frictional resistance, whereby the movable body is rapidly moved in changing its position so as to improve the response performance.

However, the aforementioned conventional technology performs current feedback from a linear solenoid for each period of the PWM pulse for generating a dither, and thus there exists a problem that processing load for generating a dither increases.

SUMMARY

A controller according to the present disclosure includes a target current controller, a dither controlling unit, an output-duty generating unit, and a Pulse-Width-Modulation-pulse (PWM-pulse) converting unit. The dither controlling unit generates a dither duty for providing, to a target current duty of a load, a dither having predetermined dither period. The target current controller calculates, for each predetermined feedback period, an average value of a feedback current from the load and generates the target current duty based on the average value. The output-duty generating unit generates an output duty obtained by adding the dither duty generated by the dither controlling unit to the target current duty generated by the target current controller. The PWM-pulse converting unit converts the output duty generated by the output-duty generating unit to PWM pulses.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 5 is a flowchart illustrating an average-current-value calculating process according to the embodiment;

FIG. 7 is a diagram illustrating the outline of the AD-input-voltage average-value annealing process according to the embodiment;

FIG. 9 is a diagram illustrating the outline of calculation of the number of PWM pulses generated in one dither period according to the embodiment;

DESCRIPTION OF EMBODIMENT

Hereinafter, an exemplary embodiment of a load driving controller disclosed in the present application will be described in detail with reference to the accompanying drawings. The following embodiment is merely one example, and is not intended to limit the present application. For example, in the following embodiment, a case will be explained in which a dither (slight vibration) is provided to a target current in driving a linear solenoid so as to reduce frictional resistance in slide part of a hydraulic valve, not limited thereto, may be widely applied to a common actuator (load) whose drive is controlled by providing a dither to a target current.

In the following embodiment, configurations and processes according to a disclosed technology will be mainly explained, and explanation of another configuration and process omitted. The embodiment and a modification thereof may be appropriately combined with each other in a consistent range. Note that in the following, the common configurations and processes are represented with same symbols and the description is omitted appropriately.

Outline of Configuration and Process of Driving Apparatus

Figure 1:
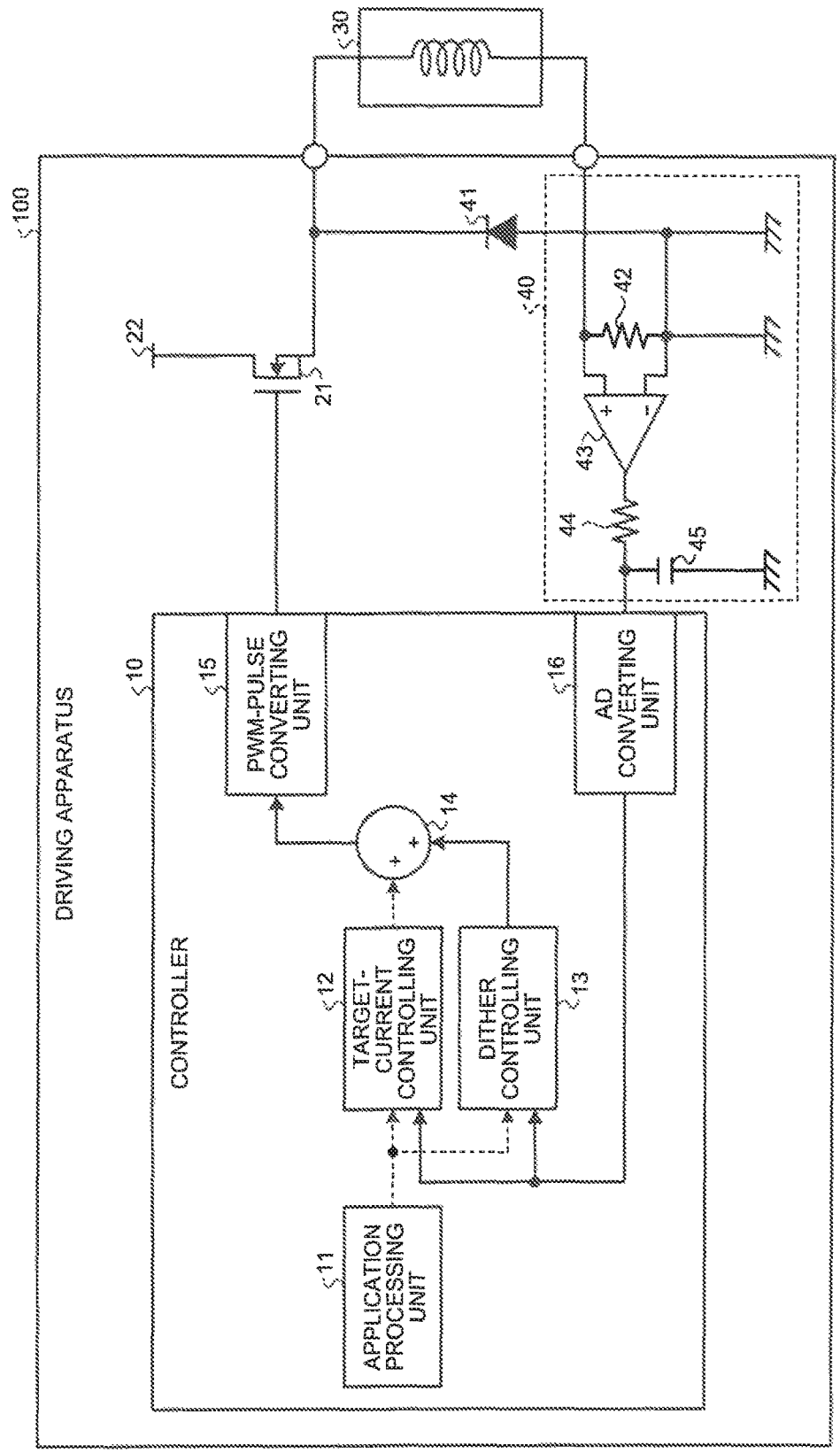
FIG. 1 is a diagram illustrating a configuration of a driving apparatus including a controller of a linear solenoid according to an embodiment.
Figure 2:
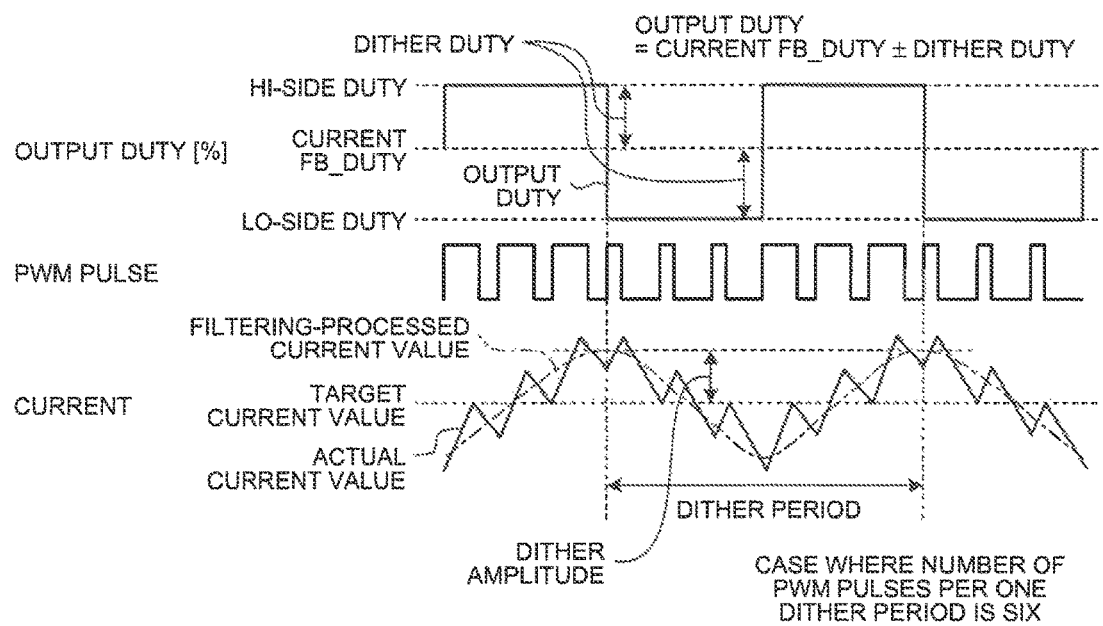
FIG. 2 is a diagram illustrating the outline of a dither controlling process according to the embodiment.
Figure 3:
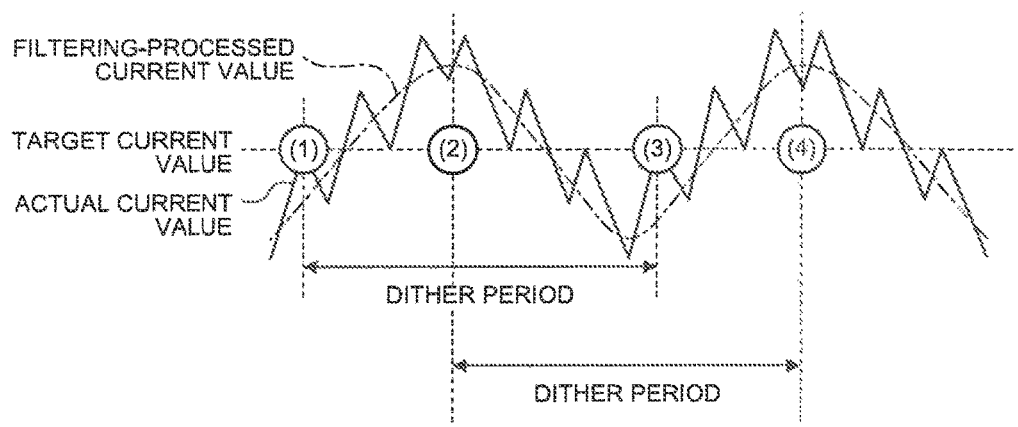
FIG. 3 is a diagram illustrating the outline of a current-feedback controlling process according to the embodiment.

FIG. 1 is a diagram illustrating a configuration of a driving apparatus including a controller of a linear solenoid according to the embodiment. FIG. 2 is a diagram illustrating the outline of a dither controlling process according to the embodiment. FIG. 3 is a diagram illustrating the outline of a current-feedback controlling process according to the embodiment.

To a driving apparatus 100, a linear solenoid 30 is connected. The linear solenoid 30 adjusts the hydraulic pressure of a supply line to drive an actuator (load: not illustrated). The driving apparatus 100 includes a controller 10, a Field Effect Transistor (FET) 21, a direct-current power supply 22, a current detector 40, and a diode 41.

The controller 10 includes an application processing unit 11, a target-current controlling unit 12, a dither controlling unit 13, an output-Duty generating unit 14, a Pulse-Width-Modulation-pulse converting unit (PWM-pulse converting unit) 15, and an AD converting unit (Analog-to-Digital converting unit) 16.

The application processing unit 11 includes: (i) a processing device such as a microcomputer for controlling the target-current controlling unit 12 and the dither controlling unit 13 in accordance with various settings; (ii) a Read Only Memory (ROM) that stores various data, such as programs and parameters; (iii) and a Random Access Memory (RAM) that temporarily memorizes data when the processing device executes a process; etc.

The target-current controlling unit 12 performs target current control for calculating a Duty (current FB_Duty: see FIG. 2) of a target current when driving the linear solenoid 30. Specifically, the target-current controlling unit 12 samples, predetermined times, an input voltage from the AD converting unit 16 for each dither period, and calculates a current FB_Duty by using an average current value based on the sampled voltage values for each dither period.

The dither controlling unit 13 performs dither control for calculating a dither (dither Duty: see FIG. 2) to be provided to a target current when driving the linear solenoid 30. Specifically, the dither controlling unit 13 calculates a target dither amplitude on the basis of a parameter such as the oil temperature so as to calculate a dither Duty by using the target dither amplitude. The target dither amplitude is higher as the oil temperature is lower, in other words, the oil viscosity is higher. The dither controlling unit 13 detects an actual dither amplitude by using current values so as to correct the dither Duty to be matched with the target dither amplitude. The dither controlling unit 13 calculates the number of PWM pulses during one dither period, adjusts a wave form of PWM pulse in accordance with the number of rising pulses and that of falling pulses, and executes a Duty guarding process for holding an output Duty obtained by adding the dither Duty to the current FB_Duty within an appropriate range so as to calculate the dither Duty.

As illustrated in FIG. 2, a dither Duty includes (i) a Hi-side Duty that is to be added to a current FB_Duty and (ii) a Lo-side Duty that is to be subtracted from a current FB_Duty. In other words, when a dither Duty is a Hi-side Duty, the output-Duty generating unit 14 calculates an arithmetic operation of "output Duty=current FB_Duty+dither Duty", for example. When a dither Duty is a Lo-side Duty, the output-Duty generating unit 14 calculates an arithmetic operation of "output Duty=current FB_Duty−dither Duty", for example. A PWM-pulse converting unit 15 generates a PWM pulse from the addition result calculated by the output-Duty generating unit 14 and outputs the generated PWM pulse.

The FET 21 is turned on and off on the basis of "Hi and Lo" of the PWM pulse output from the PWM-pulse converting unit 15 so as to chop a direct-current voltage of the direct-current power supply 22, and outputs a pulse having a driving voltage to be applied to the linear solenoid 30. The FET 21 chops the direct-current voltage of the direct-current power supply 22 and outputs the pulse of the driving voltage, whereby a current according to this pulse is to flow into the linear solenoid 30.

In the dither period illustrated in FIG. 2, a Duty ratio of a PWM pulse is smaller when the output Duty is the Lo-side Duty, and a Duty ratio of a PWM pulse is larger when the Hi-side Duty is the output Duty. The case is illustrated in FIG. 2 in which the number of PWM pulses during one dither period is six.

Therefore, in the dither period illustrated in FIG. 2, when the output Duty is the Lo-side Duty, an actual current value of the linear solenoid 30, which is indicated by solid lines, falls from a state of exceeding a target current value to a state of falling below the target current value. When the output Duty is the Hi-side Duty, the actual current value of the linear solenoid 30, which is indicated by solid lines, rises from a state of falling below the target current value to a state of exceeding the target current value.

A target amplitude (Duty ratio) and a target frequency of a dither are set to be optimized values for optimizing response performance of variable intake and exhaustion valves of an engine or a transmission such as an automatic transmission, which includes the linear solenoid 30 as a target to be driven by the hydraulic pressure of a supply line, in accordance with a structure and an operation feature of these devices, a feature of oil, the oil temperature, etc. For example, the viscosity of oil is high when the oil temperature is lower, and thus the dither control is performed so that the dither frequency is lower and the dither amplitude is higher in accordance with this oil temperature so as to drive the linear solenoid 30 appropriately.

The current detector 40 includes a resistance 42, an operational amplifier 43, a resistance 44, and a capacitor 45. The configuration of the current detector 40 illustrated in FIG. 1 is merely one example. The current detector 40 measures an actual current value when the linear solenoid 30 is driven, the operational amplifier 43 converts the actual current value into a voltage value, and the voltage value is output to the AD converting unit 16 of the controller 10. The AD converting unit 16 converts the voltage value converted by the current detector 40, which is an analog value, into a digital value and outputs the converted voltage value to the target-current controlling unit 12 and the dither controlling unit 13.

The target-current controlling unit 12 calculates, for each dither period, an average current value of the feedback current (FB current) based on the voltage feed-backed (FB: Feed Back) from the linear solenoid 30. As illustrated in FIG. 3, a dither period, which is a unit of the target-current controlling unit 12 for calculating the average current value of the feedback current, is an interval between (1)-(3) or an interval between (2)-(4), and is an interval for calculating the average current value of the feedback current during the last dither period.

In FIG. 3, the interval between (1)-(3) and the interval between (2)-(4) are overlapped with each other by an interval between (2)-(3) that is half of one dither period. Therefore, as illustrated in FIG. 3, an interval between (3)-(4) corresponds to a feedback period for calculating an average current value of a feedback current. One dither period includes a plurality of PWM periods (PWM pulses), and thus the target-current controlling unit 12 calculates the average current value of the feedback current every PWM periods.

The target-current controlling unit 12 performs the target current control, which is for calculating a target current (current FB_Duty: see FIG. 2) to be supplied to the linear solenoid 30, by using an average current value of each feedback period to be used during a corresponding dither period. The dither controlling unit 13 performs dither control for calculating a target dither amplitude of each feedback period to be used during a corresponding dither period, calculating a corresponding dither (dither Duty: see FIG. 2) that is to be provided to the target current to supplied to the linear solenoid 30 by using the calculated target dither amplitude, and further detecting an actual dither amplitude by using a current value, which is detected by the current detector 40, to perform feedback control so that the dither amplitude becomes the target dither amplitude. The output-Duty generating unit 14 calculates, for each PWM pulse, an arithmetic operation of "output Duty=current FB_Duty±dither Duty", for example. The PWM-pulse converting unit 15 converts the addition result calculated by the output-Duty generating unit 14 into PWM pulses so as to output the PWM pulses. Thus, the PWM-pulse converting unit 15 generates a dither wave shape.

Thus, when generating PWM pulses to drive the linear solenoid 30, the driving apparatus 100 generates PWM pulses by feedback control for performing the target current control and dither control by using a feedback current of the linear solenoid 30 to control the linear solenoid 30 so that the linear solenoid 30 is driven by a target current while a dither is provided thereto.

In FIG. 3, the length of one feedback period is the same as that of one dither period, and continuous two feedback periods are overlapped with each other by half of one dither period. However, the current feedback is not limited to one that is to be performed for each feedback period to be used during a corresponding dither period, and the length of one feedback period and an overlapped amount of continuous two feedback periods may be appropriately changed. A feedback period of the target current control and that of the dither control may be the same, or may be different from each other.

When the feedback period is shorter, the precision in current feedback is more improved, however, processing load of the target-current controlling unit 12 etc. becomes larger. On the other hand, when the feedback periods longer, processing load of the target-current controlling unit 12 etc. is more reduced, however, the precision in current feedback is more reduced. Thus, a feedback period may be appropriately set in accordance with desired performance under trade-off between the precision and processing load of the feed-back operation.

Target-Current Controlling Process

Figure 4A:
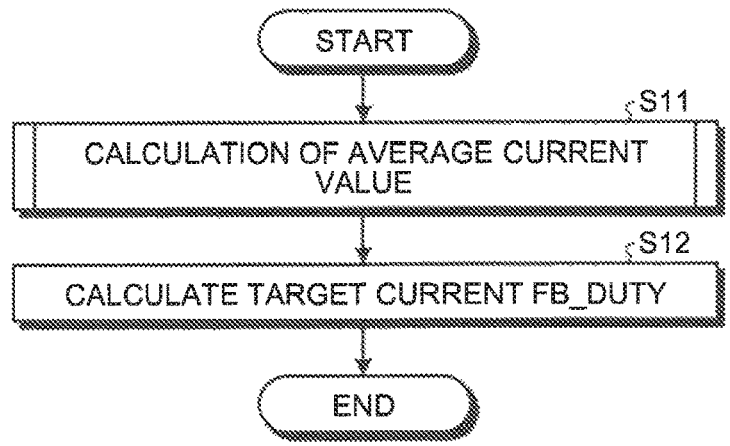
FIG. 4A is a flowchart illustrating a target-current controlling process according to the embodiment.

FIG. 4A is a flowchart illustrating a target-current controlling process according to the embodiment. The target-current controlling process according to the embodiment is executed with a predetermined period or at a predetermined opportunity. First, the target-current controlling unit 12 calculates an average current value of the feedback current from the linear solenoid 30 for each feedback period, which is to be used during a corresponding dither period (Step S11). Details of Step S11 will be mentioned later.

Next, the target-current controlling unit 12 calculates a current FB_Duty from the average current value of each feedback period to be used during a corresponding dither period, which has been calculated in Step S11 (Step S12). For example, the current FB_Duty is calculated by using a common method from relation between (i) a target operation amount of the linear solenoid 30 which has been sent from the application processing unit 11 and (ii) the average current value of each feedback period to be used during a corresponding dither period, which has been calculated in Step S11. When Step S12 is completed, the target-current controlling unit 12 terminates the target-current controlling process.

Dither Controlling Process

Figure 4B:
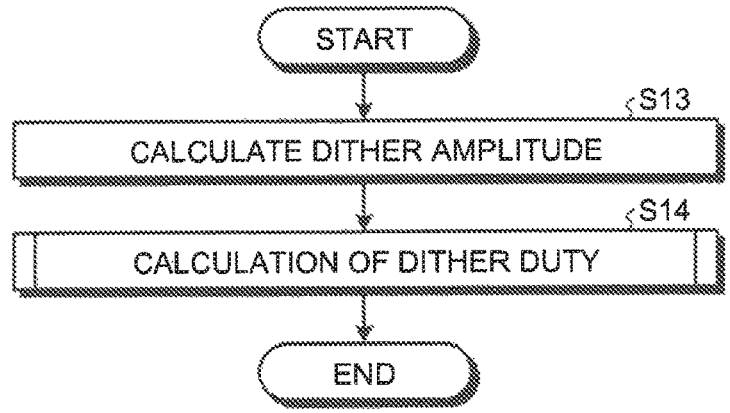
FIG. 4B is a flowchart illustrating a dither controlling process according to the embodiment.

FIG. 4B is a flowchart illustrating the dither controlling process according to the embodiment. The dither controlling process according to the embodiment is executed with a predetermined period or at a predetermined opportunity. First, as described above, the dither controlling unit 13 calculates the target dither amplitude in accordance with a structure and an operation feature of a device to be driven by the hydraulic pressure of a supply line, a feature of oil, the oil temperature, etc. (Step S13). The target dither amplitude is obtained in a current value. Next, the dither controlling unit 13 calculates a dither Duty from the target dither amplitude having been calculated in Step S13 (Step S14). Details of Step S14 will be mentioned later.

Output-Duty Calculating Process

Figure 4C:
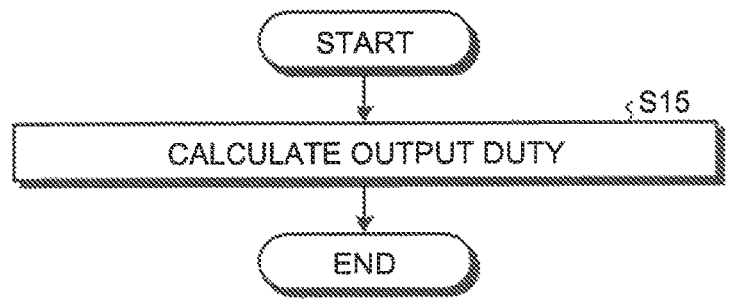
FIG. 4C is a flowchart illustrating an output-Duty calculating process according to the embodiment.

FIG. 4C is a flowchart illustrating an output-Duty calculating process according to the embodiment. The output-Duty calculating process according to the embodiment is executed for each PWM pulse. The output-Duty generating unit 14 calculates an output Duty from (i) the current FB_Duty having been calculated in Step S12 (see FIG. 4A) of the target-current controlling process and (ii) the dither Duty having been calculated in Step S13 (see FIG. 4A) of the target-current controlling process (Step S15). When Step S15 is completed, the output-Duty generating unit 14 terminates the output-Duty calculating process.

Average-Current-Value Calculating Process

FIG. 5 is a flowchart illustrating an average-current-value calculating process according to the embodiment. The flowchart illustrated in FIG. 5 is a subroutine corresponding to the process of Step S11 illustrated in FIG. 4A.

First, the target-current controlling unit 12 samples, predetermined times, an input voltage sent from the AD converting unit 16 for each feedback period, which is to be used during a corresponding dither period, and calculates an AD-input-voltage average value obtained by averaging the sampled voltage values (Step S11-1). Next, the target-current controlling unit 12 calculates a changed amount (AD-input-voltage average-value change amount) of a present value from the last value of the AD-input-voltage average value of each feedback period to be used during a corresponding dither period, which has been calculated in Step S11-1 (Step S11-2).

Figure 6:
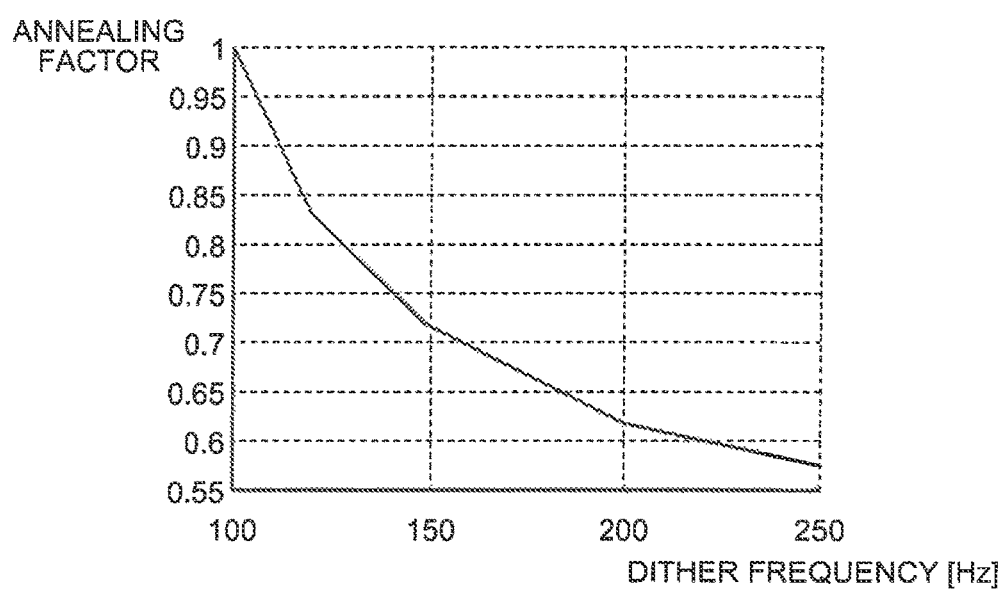
FIG. 6 is a diagram illustrating an annealing factor to be used in an AD-input-voltage average-value annealing process of the average-current-value calculating process according to the embodiment.

Next, the target-current controlling unit 12 performs an annealing process (filtering process) on the AD-input-voltage average value having been calculated in Step S11-1 on the basis of the following formula (1) (Step S11-3). In the following formula (1), "last value" indicates "AD-input-voltage average value of each feedback period to be used during corresponding dither period just before present AD-input-voltage average value of each feedback period to be used during corresponding dither period", and "before-annealing value" indicates "present AD-input-voltage average value of each feedback period to be used during corresponding dither period". In the following formula (1), "annealing factor" indicates "factor to be multiplied to difference between before-annealing value and last value", and is a factor exemplified in FIG. 6. FIG. 6 is a diagram illustrating an annealing factor to be used in an AD-input-voltage average-value annealing process of the average-current-value calculating process according to the embodiment. In the following formula (1), "before-annealing value−last value" indicates a change amount of the AD-input-voltage average value calculated in Step S11-2.

$$\text{After-Annealing Value} = \text{Last Value} + (\text{Before-Annealing Value} - \text{Last Value}) \times \text{Annealing Factor} \quad (1)$$

The annealing process indicated by the above formula (1) is for suppressing change in the feedback response by, for example, bringing the AD-input-voltage average value in a dither frequency range that is able to be set close to an AD-input-voltage average value whose dither frequency is of the slowest response (annealing process). In other words, feedback constant values including a proportional constant value, an integration constant value, and a differential constant value of Proportional-Integral-Differential control (PID control) of the target-current controlling unit 12 are tuned to be able to perform the feedback control at the maximum dither frequency or the minimum dither frequency which is able to be set. Therefore, the feedback response is to be kept constant by bringing an AD-input-voltage average value close to an AD-input-voltage average value having a dither frequency to which feedback constant values that are tuned.

FIG. 7 is a diagram illustrating the outline of the AD-input-voltage average-value annealing process according to the embodiment. For example, it is assumed that a range of dither frequency, which is able to be set, is 100 to 250 [Hz]. The feedback constant values of PID control including a proportional constant value, an integration constant value, and a differential constant value of the target-current controlling unit 12 are assumed to be tuned to those of a dither frequency 100 [Hz]. In this case, the annealing process according to the above formula (1) brings AD-input-voltage average values in all of the frequencies close to the AD-input-voltage average value of the dither frequency 100 [Hz]. For example, as indicated by the separated part between a solid line and a dashed line illustrated in an upper part of FIG. 7, in a case where a dither frequency is 200 [Hz], when the target current control is performed by using an average current based on an AD input voltage obtained for each dither period, a dither period is changed in accordance change in the dither frequency. Thus, when the same feedback constant values are used, change in a response of the linear solenoid 30 occurs.

Therefore, an annealing factor approximate "0.62", which corresponds to a dither frequency 200 [Hz], is read from the graph illustrated in FIG. 6 on the basis of the above formula (1). When "last value", "last value of AD input voltage of dither period at dither frequency 200 [Hz]", "before-annealing value", "present value (before annealing) of AD input voltage of dither period at dither frequency 200 [Hz]", "annealing factors", and "0.62" are substituted for the above formula (1), "last AD-input-voltage average value (after-annealing value) of dither frequency at dither frequency 200 [Hz]" is approximately matched with "last AD-input-voltage average value of dither frequency at dither frequency 100 [Hz]". In other words, as illustrated in a lower part of FIG. 7, a difference between "last AD-input-voltage average value (after-annealing value) of dither frequency at dither frequency 200 [Hz]" and "last AD-input-voltage average value of dither frequency at dither frequency 100 [Hz]" is equal to or less than a predetermined value. The same applies to a case of another dither frequency.

When the feedback constant values of PID control including a proportional constant value, an integration constant value, and a differential constant value are tuned so that the feedback control is able to be performed at the maximum dither frequency that is able to be set, the target-current controlling unit 12 performs a process for bringing (progressing) the AD-input-voltage average value in a dither frequency range that is able to be set close to an AD-input-voltage average value whose dither frequency is of the fastest response.

The AD-input-voltage average value may be calculated without using Steps S11-1 to 11-3 including the annealing process. For example, as illustrated in FIGS. 2 and 3, when an average current value is calculated from actual current values, a filter may be provided that is for removing a component in a dither frequency from the actual current value, and a filtering-processed current value may be calculated as an average current. This filter includes, for example, a low-pass filter for cutting a high-frequency wave whose frequency is equal to or more than a frequency at which there exists no separation from an actual wave shape as an average current and at which sufficient responsiveness is ensured.

Next, the target-current controlling unit calculates an average current value for one dither period to be used in current-feedback control from the AD-input-voltage average value on which the annealing process is executed in Step S11-3 (Step S11-4). When Step S11-4 is completed, the target-current controlling unit 12 shifts the process to Step S12 illustrated in FIG. 4A. Each of the calculation of the average current value for one dither period based on the AD-input-voltage average value after the aforementioned annealing process and the calculation of the average current value for one dither period executed by the aforementioned filtering process is one example of a predetermined adjusting process that is executed so that, when a dither frequency is changed in a first period and a second period just after the first period among predetermined dither periods, a difference of an average value of the feedback current, which is calculated in the second period, from an average value of the feedback current, which is calculated in the first period, is equal to or less than a predetermined value.

Dither-Duty Calculating Process

Figure 8:
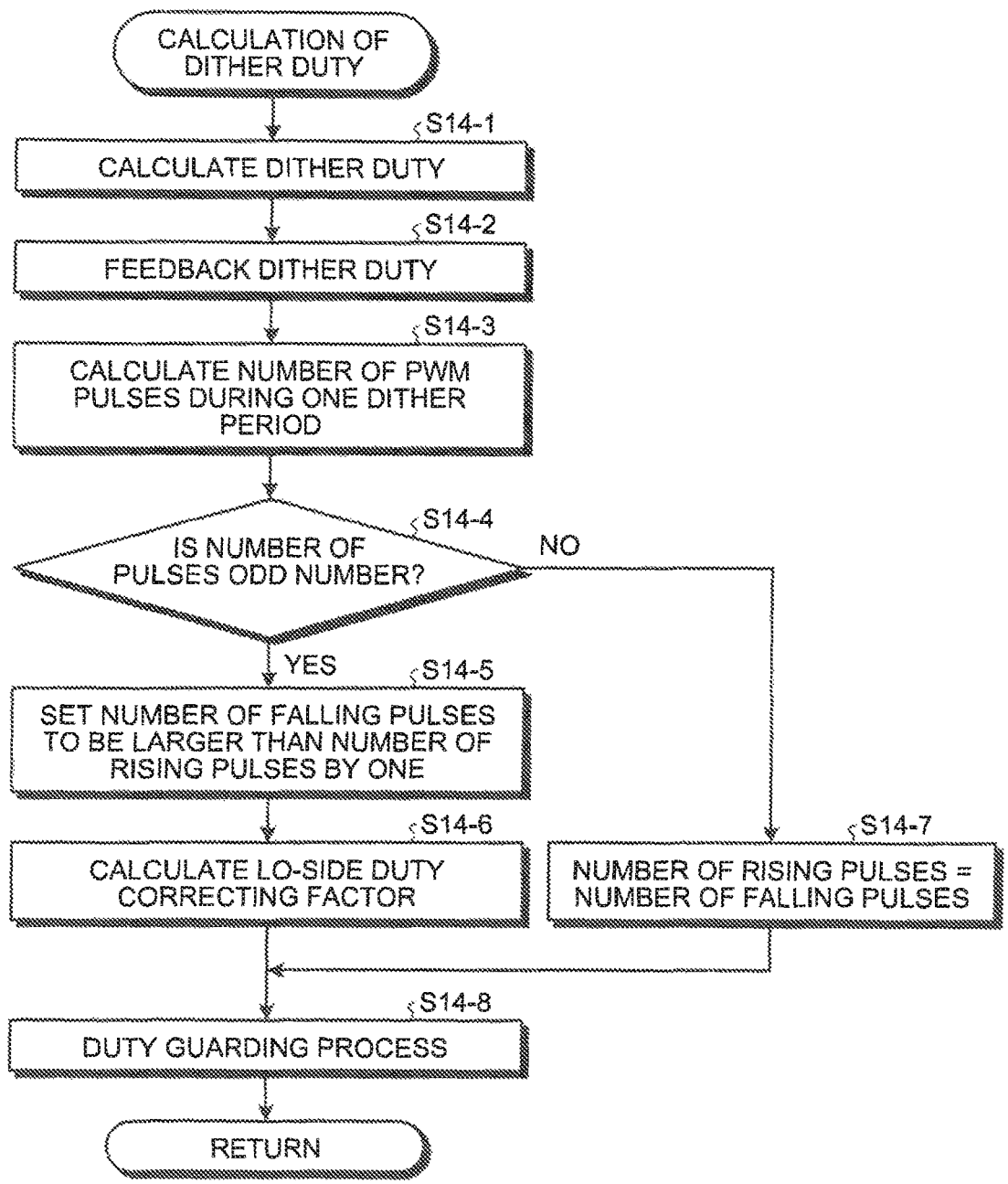
FIG. 8 is a flowchart illustrating a dither-Duty calculating process according to the embodiment.

FIG. 8 is a flowchart illustrating a dither-Duty calculating process according to the embodiment. The process illustrated in FIG. 8 is a subroutine corresponding to the process of Step S13 illustrated in FIG. 4B.

First, the dither controlling unit 13 calculates a dither Duty on the basis of the target dither amplitude having been calculated in Step S13 (Step S14-1). Next, the dither controlling unit 13 performs feedback control on a dither Duty on the basis of a difference between the target dither amplitude and an actual dither amplitude (Step S14-2).

Specifically, the dither controlling unit 13 calculates a maximum current value from a maximum voltage value in units of dither periods of the voltage sent from the AD converting unit 16, and calculates an actual dither amplitude from a difference from the average current value having been calculated in Step S11-4. When the actual dither amplitude is larger than the target dither amplitude, the dither Duty is reduced, when the actual dither amplitude is smaller than the target dither amplitude, the dither Duty is increased.

Next, the dither controlling unit 13 calculates the number of PWM pulses during one dither period (Step S14-3). The dither controlling unit 13 changes the number of PWM pulses (PWM frequency) per dither period in accordance with the dither frequency so that the PWM frequency does not exceed a predetermined upper limit.

FIG. 9 is a diagram illustrating the outline of calculation of the number of PWM pulses generated in one dither period according to the embodiment. For example, FIG. 9, an upper limit of the PWM frequency per dither period is 1000 [Hz]. For example, as illustrated in FIG. 9, the PWM frequency is 1000 [Hz], when the dither frequency is 100 [Hz], the number of PWM pulses per dither period is tolerated up to "1000/100=10".

In other words, when a dither frequency is "d" [Hz], the number of PWM pulses is tolerated up to "1000/d". Here "[*]" is a Gauss symbol and indicates a maximum integer that does not exceed "*". Therefore, for example, when the PWM frequency is 1000 [Hz] and the dither frequency is larger than 100 [Hz] and less than 112 [Hz], the number of PWM pulses per dither period is tolerated up to nine. In this case, the PWM frequency is reduced by reduction of the number of PWM pulses per dither period and is raised in accordance with rise in the dither frequency, when the dither frequency 112 [Hz], the PWM frequency exceeds again 1000 [Hz] that is an upper limit. Thus, the number of PWM pulses per dither period is further reduced by one, and is tolerated up to eight. Subsequent processes are the same thereas.

As illustrated in FIG. 9, as the dither frequency increases, the PWM frequency fluctuates up and down like a sawtooth wave with a PWM frequency 1 [kHz] as an upper limit as the number of PWM pulses per dither period is reduced in a step-by-step manner in order to keep the PWM frequency equal to or less than 1000 [Hz]. In the example illustrated in FIG. 9, the PWM frequency is within a range between 800-1000 [Hz] when the dither frequency is changed so as to reduce a change width of the PWM frequency when the dither frequency is changed, and thus change in the responsiveness is little and it is possible to reduce effects on the current-feedback control.

Not limited to the aforementioned, an upper limit of the PWM frequency may be changed at satisfaction of any of the following conditions of (condition 1) to (condition 5) as an opportunity.

(condition 1) A temperature feature of oil when the temperature of pressure regulating oil of the linear solenoid 30 exceeds or falls below respective predetermined values. (For example, the oil viscosity is reduced when the oil temperature is high, the responsiveness of the linear solenoid 30 is improved by increase in the PWM frequency. For example, the oil viscosity is increased when the oil temperature is low, the responsiveness of the linear solenoid 30 is ensured by reduction in the PWM frequency.)

(condition 2) An operation stop on a target of the linear solenoid 30, whose pressure is to be controlled. (For example, when pressure regulation of a transmission such as an automatic, transmission is stopped caused by a stop of a vehicle)

(condition 3) A dither wave shape when the PWM period is to be synchronized with the dither period.

(condition 4) The temperature of a configuration part (for example, Integrated Circuit (IC), microcomputer, etc.) of the PWM-pulse converting unit 15 or a solenoid driver (the FET 21) is lower than a predetermined value. (In order to improve controllability when a certain amount of heavy load is tolerated.)

(condition 5) A configuration part and a solenoid driver of the PWM-pulse converting unit 15 are heavy loaded or the high temperature. (In order to prevent over loaded or over heated.)

Next, the dither controlling unit 13 determines whether or not the number of pulses per one dither period having been calculated in Step S14-3 is an odd number (Step S14-4). When the number of pulses per one dither period having been calculated in Step S14-3 is an odd number (Step S14-4: Yes), the dither controlling unit 13 shifts the process to Step S14-5. On the other hand, when the number of pulses per one dither period having been calculated in Step S14-3 is an even number (Step S14-4: No), the dither controlling unit 13 shifts the process to Step S14-7.

In Step S14-5, the dither controlling unit 13 sets the number of falling pulses to be larger than the number of rising pulses by one. The rising pulse indicates a PWM pulse to be output during an interval of the Hi-side Duty illustrated in FIG. 2, and the falling pulse indicates a PWM pulse to be output during an interval of the Lo-side Duty.

Next, the dither controlling unit 13 calculates a Lo-side Duty correcting factor (Step S14-6). Specifically, the dither controlling unit 13 multiplies a rising pulse or a falling pulse of the dither Duty by a correcting factor so as to reduce abnormality in a wave shape of the PWM pulse generated by a difference between the number of rising pulses and that of falling pulses.

Figure 10A:
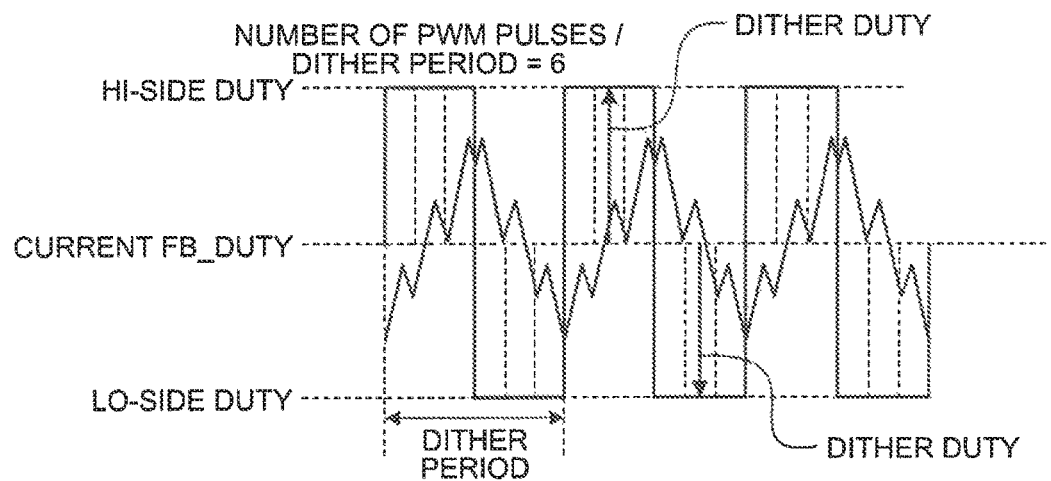
FIG. 10A is a diagram illustrating a dither wave shape when the number of PWM pulses is symmetric.
Figure 10B:
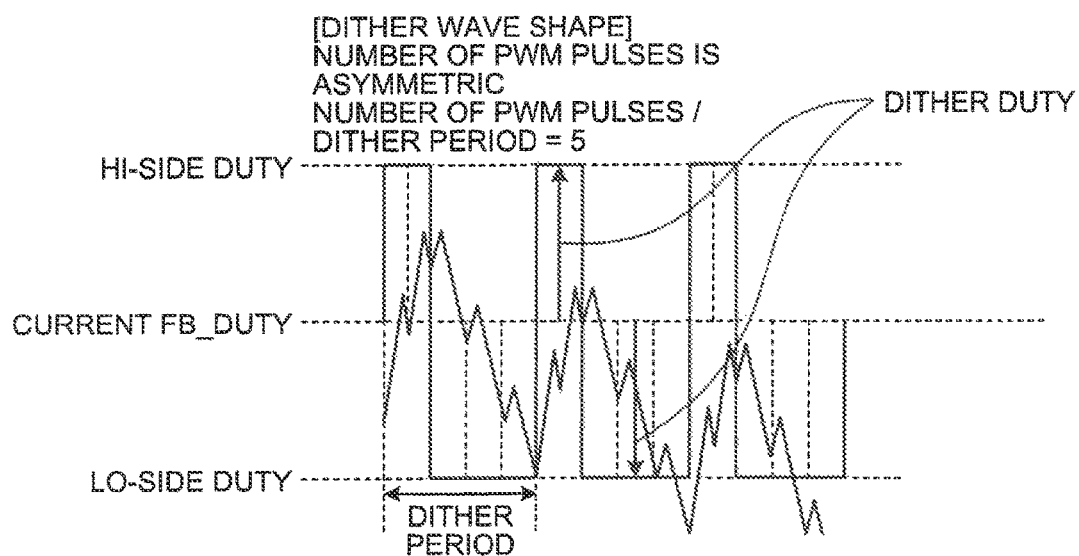
FIG. 10B is a diagram illustrating a dither wave shape when the number of PWM pulses is asymmetric.
Figure 10C:
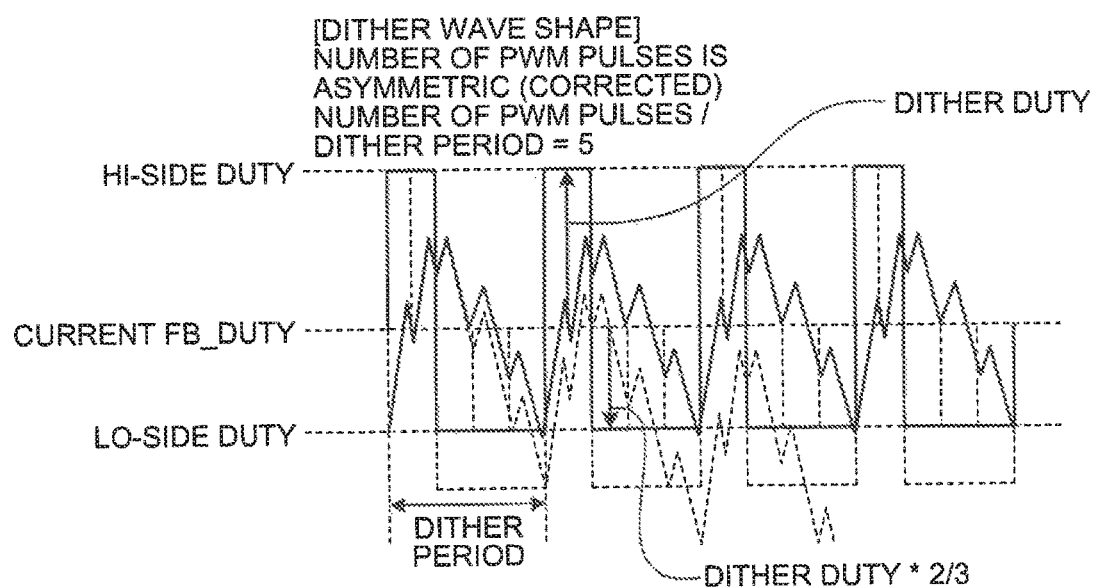
FIG. 10C is a diagram illustrating adjustment of a Duty of a pulse when the number of PWM pulses is asymmetric.

The process of Step S14-6 will be explained with reference to FIGS. 10A and 10B. FIG. 10A is a diagram illustrating a dither wave shape when the number of PWM pulses is symmetric. FIG. 10B is a diagram illustrating a dither wave shape when the number of PWM pulses is asymmetric. For example, as illustrated in FIG. 10A, when the number of PWM pulses per dither period is six (even number), each of the number of rising pulses and that of falling pulses is three and the numbers are balanced with each other, and thus disorder around a current FB_Duty in a dither wave shape does not occur.

However, for example, as illustrated in FIG. 10B, when the number of PWM pulses per dither period is five (odd number), the number of rising pulses is two and the number of falling pulses is three, for example, and the numbers are not balanced with each other, and thus disorder around a current FB_Duty in a dither wave shape occurs. For example, in FIG. 10B, the number of falling pulses is more than that of rising pulses, and thus disorder occurs in which the dither wave shape falls gradually.

When the number of PWM pulses per dither period is an odd number, a ratio between the number of rising pulses and that of falling pulses is multiplied to the Duties of the pulses having larger number so as to equalize a total of the Duties of the rising pulses with that of the falling pulses. For example, as illustrated in FIG. 10B, when the number of rising pulses is two and that of falling pulses is three, for example, "Lo-side Duty correcting factor=2/3" is multiplied to the duties of the falling pulses, a total of the Duties of the rising pulses is equalized with that of the falling pulses, the number of the rising pulses and that of the falling pulses are balanced with each other, and thus disorder around a current FB_Duty in a dither wave shape does not occur. Alternatively, for example, the number of rising pulses is two and that of falling pulses is three, for example, "Hi-side Duty correcting factor=3/2" may be multiplied to the duties of the rising pulses.

On the other hand, in Step S14-7, the dither controlling unit 13 equalizes the number of rising pulses with that of falling pulses. When any of Step S14-6 and Step S14-7 is completed, the dither controlling unit 13 shifts the process to Step S14-8.

In Step S14-8, the dither controlling unit 13 executes the Duty guarding process. The Duty guarding process is as follows. An output Duty to be output from the controller 10 is obtained by "output Duty=current FB_Duty±dither Duty", there exists a case in which the output Duty goes out of a range between upper and lower limits of 0 to 100% depending on values of the current FB_Duty and the dither Duty. The Duty guarding process is a process in which, when a dither-Duty upper limit for holding the output Duty within a range between upper and lower limits of 0 to 100% is decided and the dither Duty exceeds the dither-Duty upper limit, the dither Duty is guarded at the upper limit value by a formula (2) to be mentioned later, alternatively, formulae (3-1) and (3-2) to be mentioned later.

Figure 11A:
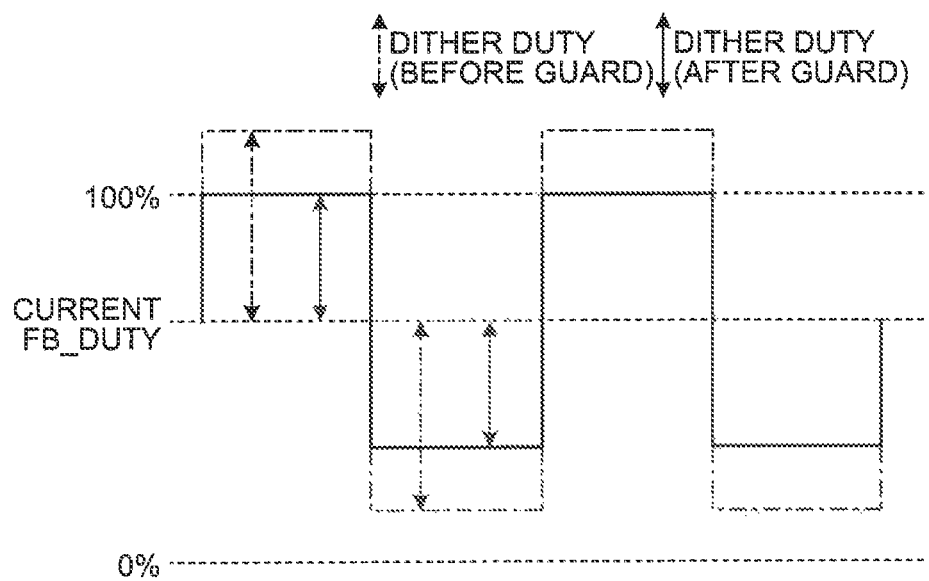
FIG. 11A is a diagram illustrating the outline of a Duty guarding process (when dither-Duty upper limit exceeds upper limit) according to the embodiment.
Figure 11B:
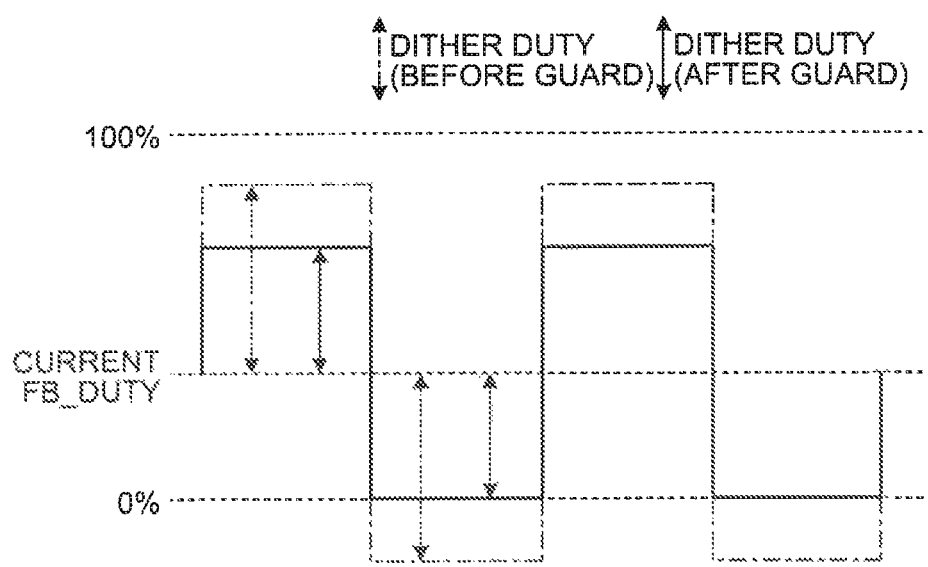
FIG. 11B is a diagram illustrating the outline of the Duty guarding process (when dither-Duty lower limit is less than lower limit) according to the embodiment.

FIG. 11A is a diagram illustrating the outline of the Duty guarding process (when dither-Duty upper limit exceeds upper limit) according to the embodiment. FIG. 11B is a diagram illustrating the outline of the Duty guarding process (when dither-Duty lower limit is less than lower limit) according to the embodiment.

As illustrated in FIG. 11A, when a dither Duty is added to the current FB_Duty, a rising pulse exceeds the upper limit. As illustrated in FIG. 11B, when a dither Duty is added to the current FB_Duty, a falling pulse is less than the lower limit. The dither controlling unit 13 calculates a dither-Duty upper limit on the basis of the following formula (2), for example. In the following the formula (2), min(*) is a function that outputs a minimum value of "*", and "Lo-side Duty correcting factor" is as described above, when "Hi-side Duty correcting factor" is used instead of "Lo-side Duty correcting factor", "Lo-side Duty correcting factor" in the following the formula (2) is replaced by "Hi-side Duty correcting factor".

$$\text{Dither-Duty Upper Limit} = \min\left(100 - \text{Current FB\_Duty}, \frac{\text{Current FB\_Duty}}{\text{Lo-side Duty Correcting Factor}}\right) \quad (2)$$

Herein, "100−current FB_Duty" in the above formula (2) is a term for restricting a rising pulse so as not to exceed an upper limit 100%, "current FB_Duty/Lo-side Duty correcting factor" is a term for restricting the falling pulse so as not to fall below a lower limit 0%. By the above formula (2), it is possible to hold both rising pulses and falling pulses of the dither Duty within an appropriate range.

As described above, there exists a case where a dither Duty of the falling pulse is corrected by using a multiplier of "Lo-side Duty correcting factor", and thus "current FB_Duty/Lo-side Duty correcting factor" is divided by "Lo-side Duty correcting factor" to rebate this corrected amount. When the dither Duty of the falling pulse is not corrected, "Lo-side Duty correcting factor=1" is satisfied.

Note that the dither-Duty upper limit and the dither-Duty lower limit may be decided by the following formulae (3-1) and (3-2) instead of the above formula (2). In the following formula (3-1), min(*) is a function for outputting a minimum value of "*", and in the following formula (3-2), max(*) is a function for outputting a maximum value of "*".

$$\text{Dither-Duty Upper Limit} = \min(100, \text{Current FB\_Duty} + \text{Dither Duty}) \quad (3\text{-}1)$$

$$\text{Dither-Duty Lower Limit} = \max(0, \text{Current FB\_Duty} + \text{Dither Duty}) \quad (3\text{-}2)$$

The above formula (3-1) is a formula for holding a rising pulse so as not to exceed an upper limit 100%, and the above formula (3-2) is a formula for holding a falling pulse so as not to fall below a lower limit 0%. In the above formulae (3-1) and (3-2), when a rising pulse and a falling pulse are asymmetric, "dither Duty" corrected by multiplying "Hi-side Duty correcting factor" or "Lo-side Duty correcting factor" is to be used. By employing the above formulae (3-1) and (3-2), it is possible to hold both of the rising pulse and the falling pulse of the dither Duty within an appropriate range.

When Step S14-8 is completed, the dither controlling unit 13 shifts the process to Step S14 illustrated in FIG. 43.

Returning to FIG. 43, the process of Step S14 will be explained. In Step S14, the output-Duty generating unit 14 adds the dither Duty, on which the Duty guarding process is executed in Step S14-8 illustrated in FIG. 8, to the current FB_Duty, which is calculated in Step S12 illustrated in FIG. 4A on the basis of each of the following formulae (4-1) and (4-2), so as to calculate a Hi-side output Duty and a Lo-side output Duty.

$$\text{Hi-side Output Duty} = \text{Current FB\_Duty} + \text{After-Guard Dither Duty} \quad (4\text{-}1)$$

$$\text{Lo-side Output Duty} = \text{Current FB\_Duty} - (\text{After-Guard Dither Duty} \times \text{Lo-side Duty Correcting Factor}) \quad (4\text{-}2)$$

Note that "after-guard dither Duty" of a second term in the right side of the above formula (4-1) is a dither Duty on which a guard process is executed on the basis of the above formula (2) or the above formulae (3-1) and (3-2). The "after-guard dither Duty" of a second term in the right side of the above formula (4-2) is a dither Duty on which the guard process is executed on the basis of the above formula (2) or the above formulae (3-1) and (3-2). The "Lo-side Duty correcting factor" in a second term in the right side of the above formula (4-2) is as mentioned above, when "Hi-side Duty correcting factor" is used instead of "Lo-side Duty correcting factor", the "Lo-side Duty correcting factor" in the above formula (4-2) is replaced by "Hi-side Duty correcting factor".

Alternatively, the Duty guarding process is not executed in Step S14-8 illustrated in FIG. 8, and in the process of Step S14 illustrated in FIG. 4B, the Duty guarding process may be executed simultaneously with the calculation of the Hi-side output Duty and the Lo-side output Duty on the basis of the following formulae (5-1) and (5-2). The following formulae (5-1) and (5-2) are formulae obtained by combining the above formulae (3-1) and (3-2) with the above formulae (4-1) and (4-2).

$$\text{Hi-side Output Duty} = \min(100, \text{Current FB\_Duty} + \text{After-Guard Dither Duty}) \quad (5\text{-}1)$$

$$\text{Lo-side Output Duty} = \max(0, \text{Current FB\_Duty} - (\text{After-Guard Dither Duty} \times \text{Lo-side Duty Correcting Factor})) \quad (5\text{-}2)$$

According to the above embodiment, an average value of a feedback current from a load is calculated for each feedback period, a current FB_Duty is generated on the basis of the average value, and an output Duty is generated obtained by adding the current FB_Duty to a dither Duty. In other words, current feedback for the target current control is executed for each feedback period including a plurality of PWM periods, so that it is possible to reduce processing load of the controller 10.

According to the above embodiment, the dither frequency is variable, and the number of PWM pulses per predetermined dither period when the dither Duty is converted into the PWM pulses is calculated so that a PWM frequency based on the number of the PWM pulses does not exceed a predetermined upper limit. In other words, the number of the PWM pulses is variable and the number of the PWM pulses of the dither is set so that the PWM frequency does not exceed the predetermined upper limit, and thus it is possible to reduce the load of a driver of the linear solenoid 30 and to suppress heat generation.

According to the above embodiment, the dither frequency is variable, when the frequency of the dither is changed during a first period and a second period just after the first period, a predetermined adjusting process is executed so that a difference of an average value of the feedback current calculated in the second period from an average value of the feedback current calculated in the first period is equal to or less than a predetermined value. In other words, when the dither frequency is changed, the feedback constant values are not to be tuned, and it is possible to keep control response constant by using constant feedback constant values.

According to the above embodiment, the number of PWM pulses per predetermined dither periods when a dither Duty is converted into PWM pulses is calculated, a Duty correcting factor according to a ratio between the numbers of the PWM pulses, which are assigned to respective Hi-side Duty and Lo-side Duties, is multiplied by at least one of the Hi-side Duty and the Lo-side Duty, whereby an average Duties of the respective Hi-side and the Lo-side Duties per predetermined dither periods are equalized with each other. In other words, even when the number of pulses constituting a dither wave shape is an odd number, the average Duties of the respective Hi-side and Lo-side Duties are equalized with each other, so that it is possible to reduce disorder in a dither wave shape.

According to the above embodiment, the guard process is executed on a dither Duty so that the Duty obtained by adding the dither Duty to the target current Duty is held within a range between predetermined upper and lower limits, so that possible to generate an appropriate dither Duty.

Among the processes having been explained in the embodiment, all or a part of the processes, which are explained to be automatically executed, may be manually executed. Alternatively, among the processes having been explained in the embodiment, all or a part of the processes, which are explained to be manually executed, may be automatically executed.

The separation or integration of the units having been explained in the embodiment may be appropriately changed on the basis of processing load and processing efficiency. Moreover, processing procedures, controlling procedures, specific appellations, and information including various data and parameters, which are aforementioned and illustrated, are appropriately changed if not otherwise specified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A load driving controller comprising:
a dither controlling unit that generates a dither duty for providing, to a target current duty of a load, a dither having predetermined dither period;
a target current controller that calculates, for each predetermined feedback period, an average value of a feedback current from the load and generates the target current duty based on the average value;
an output-duty generating unit that generates an output duty obtained by adding the dither duty generated by the dither controlling unit to the target current duty generated by the target current controller; and
a Pulse-Width-Modulation-pulse (PWM-pulse) converting unit that converts the output duty generated by the output-duty generating unit to PWM pulses for driving the load, wherein
a frequency of the dither is variable, and
the dither controlling unit calculates, in a case where the dither duty is converted into PWM pulses, a number of the PWM pulses per the predetermined dither period so that a PWM frequency based on the number of the PWM pulses does not exceed a predetermined upper limit.

2. The load driving controller according to claim 1, wherein the dither controlling unit executes a guard process on the dither duty so that a duty obtained by adding the dither duty to the target current duty falls within a range between predetermined upper and lower limits.

3. A load driving controller comprising:
a dither controlling unit that generates a dither duty for providing, to a target current duty of a load, a dither having predetermined dither period;
a target current controller that calculates, for each predetermined feedback period, an average value of a feedback current from the load and generates the target current duty based on the average value;
an output-duty generating unit that generates an output duty obtained by adding the dither duty generated by the dither controlling unit to the target current duty generated by the target current controller; and
a Pulse-Width-Modulation-pulse (PWM-pulse) converting unit that converts the output duty generated by the output-duty generating unit to PWM pulses for driving the load, wherein
a frequency of the dither is variable, and
the target current controller executes, when a frequency of the dither is changed between a first period and a second period that is just after the first period included in the predetermined dither period, a predetermined adjusting process so that a difference of an average value of the feedback current calculated in the second period from that calculated in the first period is equal to or less than a predetermined value.

4. The load driving controller according to claim 3, wherein the dither controlling unit executes a guard process on the dither duty so that a duty obtained by adding the dither duty to the target current duty falls within a range between predetermined upper and lower limits.

5. A load driving controller comprising:
a dither controlling unit that generates a dither duty for providing, to a target current duty of a load, a dither having predetermined dither period;
a target current controller that calculates, for each predetermined feedback period, an average value of a feedback current from the load and generates the target current duty based on the average value;
an output-duty generating unit that generates an output duty obtained by adding the dither duty generated by the dither controlling unit to the target current duty generated by the target current controller; and
a Pulse-Width-Modulation-pulse (PWM-pulse) converting unit that converts the output duty generated by the output-duty generating unit to PWM pulses for driving the load,
wherein the dither controlling unit calculates, when the dither duty is converted into PWM pulses, a number of the PWM pulses per the predetermined dither period, and multiplies at least one of a Hi-side duty and a Lo-side duty by a duty correcting factor according to a ratio between numbers of PWM pulses that are assigned to the respective Hi-side and Lo-side duties, the duty correcting factor being for equalizing average duties of the respective Hi-side and Lo-side duties per the predetermined dither period to each other.

6. The load driving controller according to claim 5, wherein the dither controlling unit executes a guard process on the dither duty so that a duty obtained by adding the dither duty to the target current duty falls within a range between predetermined upper and lower limits.

* * * * *